D. L. STILES.
Cooking Stove.
No. 3,248.
Reissued Dec. 29, 1868.
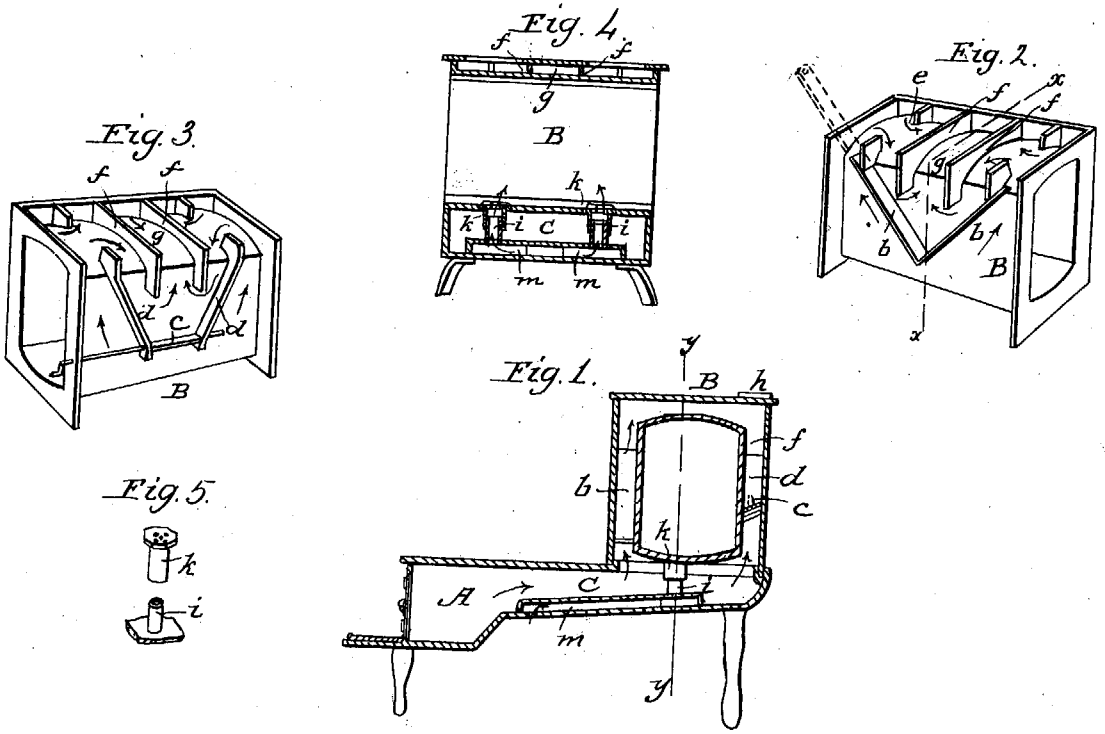
Witnesses:
J. Prasser
S. J. Allis.
Inventor:
David L. Stiles
N. PETERS, Photo-Lithographer, Washington, D. C.

United States Patent Office.

AUGUSTA P. STILES, OF ROCHESTER, NEW YORK, ASSIGNEE, BY MESNE ASSIGNMENTS, OF DAVID L. STILES.

*Letters Patent No.* 37,778, *dated February* 24, 1863; *reissue No.* 3,248, *dated December* 29, 1868.

IMPROVEMENT IN COOKING-STOVES.

The Schedule referred to in these Letters Patent and making part of the same.

*To all whom it may concern:*

Be it known that DAVID L. STILES, of Rochester, in the county of Monroe, and State of New York, did invent a new and improved Mode of Constructing Cooking-Stoves, dated February 24, 1863, of which invention I, AUGUSTA P. STILES, of Rochester, aforesaid, am sole assignee; and I do hereby declare that the following is a full and exact description thereof, reference being had to the accompanying drawings, making part of this specification, in which—

Figure 1 is a vertical section of the stove, showing the oven, on the line *x x* of fig. 2.

Figure 2 is a perspective view of the oven, with the top and front plates removed.

Figure 3 is a perspective view of the oven, with the top and back plates removed.

Figure 4 is a section on the line *y y* of fig. 1.

Figure 5 is a detached perspective view of the ventilating-tubes and thimbles, *i k*.

Like letters designate corresponding parts in all the figures.

The improvements relate to that class of stoves known as elevated-oven stoves.

As represented in the drawings—

B is the oven-portion, which rests on the fire, or heating-portion, and is held in position by flanges on the latter, which connect with the edges of the side and end-plates of the oven.

A is the fire-chamber, and

C, the throat, or large flue-space, directly underneath the oven.

Here the heated column of air and products of combustion are divided, and ascend, in equal portions, up the front and back sides of the oven.

Each of these columns is again divided in front by the inclined flue-plates or partitions *b b*, fig. 2, which deflect the ascending currents, and force them to the extreme upper and outer corners of the oven, (those portions which they usually fail to reach fully,) and on the back by similar partitions, *d d*, which differ from the former only by terminating before their lower ends meet, in order to leave space for the damper, *c*.

The columns which ascend these front and back flues meet on the top of the oven, but are caused to return by the two partitions *f f*, which carry the heated air and products of combustion partially down the front and back sides, between the inclined partitions *b b* and *d d*, until those flues unite in the central space *g*, which communicates with the smoke-pipe *h*. This arrangement overcomes a difficulty common in all ovens, and more especially elevated ovens, viz, the imperfect heating of the ends and corner-portions, those which, from their position, being most remote from the fire, are more rapidly cooled. The heated currents are forced to seek those parts before their heat is spent by pursuing the tortuous course of flues, and afterward passed around the central portion of the oven (which, not being exposed to cold air, does not lose its heat so rapidly,) and thus the heat is equally distributed to all parts.

The damper *c*, when open, allows the heat to pass directly to the smoke-pipe when the oven is not used.

Stoves have been constructed which take the heated air and products of combustion up at the corners and down through descending flues, returning it under the bottom, but these do not fully accomplish the object of this invention, as the current of hot air cannot be made to fully penetrate the angles without being deflected to those points; besides, the arrangement of those alluded to is complicated, requiring a damper in front, and the lower or fire-portion of the stove must be constructed to correspond with the flues of the oven-portion. This is not the case with this stove, as all the flue-divisions are contained in the oven-portion, the throat C, below, being only a single capacious area, which lessens the expense of construction considerably, and enables the oven-portion to be used on any other stove, of suitable size, with the same effect. It also possesses the advantage of placing the flue-plates and damper so far from the intense heat of the fire that they are far more durable than in other stoves.

The front inclined flue-plates *b b* are so constructed that they can be drawn up, as represented by dotted lines in fig. 2, to allow the dust and ashes, which accumulate above them, to fall into the space below, where they are removable. They are supported by flanges, which allow them to move readily.

In all flues surrounding stove-ovens there is a constant accumulation of dust and ashes, which, in those having vertical-flue partitions, readily fall to the bottom, where they can be conveniently removed; but where the flues are much inclined, the deposited dust remains where it falls, seriously obstructing the flues, by diminishing their area. This would be the case with the front flues of this stove if provision were not made for clearing them, by raising the movable partitions *b b*, whereby the dust which has accumulated at their junction is allowed to fall into the space C, underneath the oven.

The top of each flue-plate *b* projects by that portion of the partition which extends upon the top of the oven, and is provided with a hole, by means of which arrangement it may easily be seized by the hand, or by any hooked instrument inserted through the holes in the top of the oven, and the object accomplished.

Air is admitted, just back of the fire-chamber, into a conducting-space or air-chamber, *m*, situated in the flue C, being carried directly under the oven, where it branches in either direction, and discharges through tubes *i i*, *k k*, or equivalent connection, into the interior of the oven. This connection is formed of an inner tube or tubes, *i*, attached to the top plate of the chamber *m*, and coincident thimbles, pendent from the bottom plate of the oven, and enclosing the former, so as to exclude dust or ashes from entering the tubes, and also admitting of the ready connection and disconnection of the oven and subjacent parts.

Air has before been admitted to elevated ovens by short pipes passing directly down to the outside through the bottom of the stoves. In such cases the air cannot become heated before it reaches the oven, but, entering in its cold state, it chills the oven, and, near the inlet, it almost prevents cooking of any kind.

Air-heating chambers have before been employed, but differently arranged from this, and not employed, so far as known, in connection with an elevated oven. Such features are not broadly claimed.

The novelty in this invention consists in combining with the elevated oven an air-heating chamber, just back of the fire-chamber, which receives the heat concentrated in the narrow flue-space above, and a tube, or equivalent connection, which will allow the flow of such heated air into the oven. This arrangement of the chamber and tubes, in connection with the oven, is special, since, in elevated ovens, the oven is so far from the fire as not to readily heat inside, especially when cold air is admitted. The form of such stoves, also, where the flue-space C is naturally contracted, to economize space and material, renders the arrangement of the thin underlying air-chamber, just in the rear of the fire-chamber, essential to its perfect working.

The layer of air is so thin, and the flue-space so contracted at that point, that the maximum heating-effect is attained, which is sufficient to equalize the temperature of the inside with the outside of the oven.

The use of vertical flues in elevated stove-ovens is not claimed, neither is making flue-plates inclined or diverging, for the purpose of distributing the currents of heated air; but

What is claimed as this invention, and desired to be secured by Letters Patent, is—

1. The flue-plates *b b* and *d d*, conjointly at the bottom, but diverging toward the outer corners at the top of the oven, so that the heated air and products of combustion, in equal columns, are concentrated at those corners as it rises, in combination with the interior flue-plates *f f* and movable division-plates *b b*, in elevated-oven stoves, for the purpose of equalizing the heat throughout the same, substantially as set forth.

2. Introducing air into the oven is not broadly claimed, nor is an air-heating chamber, but the arrangement, with reference to the fire-chamber A and flue-space C, of an air-heating chamber or chambers, *m*, directly back of said fire-space, and underlying the flue-space C, and connected by the tubes *i k*, or equivalent, with the bottom of the oven, substantially as and for the purposes herein set forth.

3. In combination with the chamber or chambers *m*, and elevated oven B, the upright internal tube *i*, and external pendent thimble *k*, attached respectively to the top plate of the chamber and bottom plate of the oven, and forming a communication between the same, substantially as and for the purposes set forth.

In witness whereof, I have hereunto signed my name, in the presence of two subscribing witnesses.

AUGUSTA P. STILES.

Witnesses:

J. A. DAVIS,

J. R. DRAKE.